United States Patent [19]
Lacey

[11] 3,818,562
[45] June 25, 1974

[54] CUTTER BODY AND BLADE THEREFOR

[75] Inventor: Ralph W. Lacey, North Royalton, Ohio

[73] Assignee: Kysor Industrial Corporation, Cadillac, Mich.

[22] Filed: July 19, 1972

[21] Appl. No.: 273,138

[52] U.S. Cl. .............................. 29/105 A, 29/105 R
[51] Int. Cl. ............................................. B26d 1/12
[58] Field of Search .......... 29/105 R, 105 A, 95, 96

[56] References Cited
UNITED STATES PATENTS

| | | | |
|---|---|---|---|
| 2,930,111 | 3/1960 | St. Clair | 29/105 A |
| 3,137,918 | 6/1964 | Breuning | 29/96 |
| 3,279,035 | 10/1966 | Johnson | 29/95 |
| 3,512,236 | 5/1970 | Renaud | 29/105 R |
| 3,662,444 | 5/1972 | Erkfritz | 29/105 A |

FOREIGN PATENTS OR APPLICATIONS

| | | | |
|---|---|---|---|
| 2,016,193 | 10/1970 | Germany | 29/105 R |
| 1,502,096 | 8/1969 | Germany | 29/105 A |

*Primary Examiner*—Leonidas Vlachos
*Attorney, Agent, or Firm*—Price, Heneveld, Huizenga & Copper

[57] ABSTRACT

An edge milling cutter body and cutter blade therefor indexable to eight cutting edges is described in this specification and the accompanying drawings. The blade pockets are positioned about the periphery of the body at a prescribed lead or corner angle, with the blades held therein generally parallel to the frusto-conical surface of the cutter body. The pockets are made such that the cutting edge of the blade will have a severe negative radial rake, a very slight negative axial rake, and a lead or corner angle such that the combination results in the blade edge having an effective cutting action of negative true rake and positive angle of inclination. The blade has a primary clearance angle extending about the periphery of each of its faces and a wiping and strengthening flat at each of the eight cutting corners.

12 Claims, 10 Drawing Figures

PATENTED JUN 25 1974 3,818,562
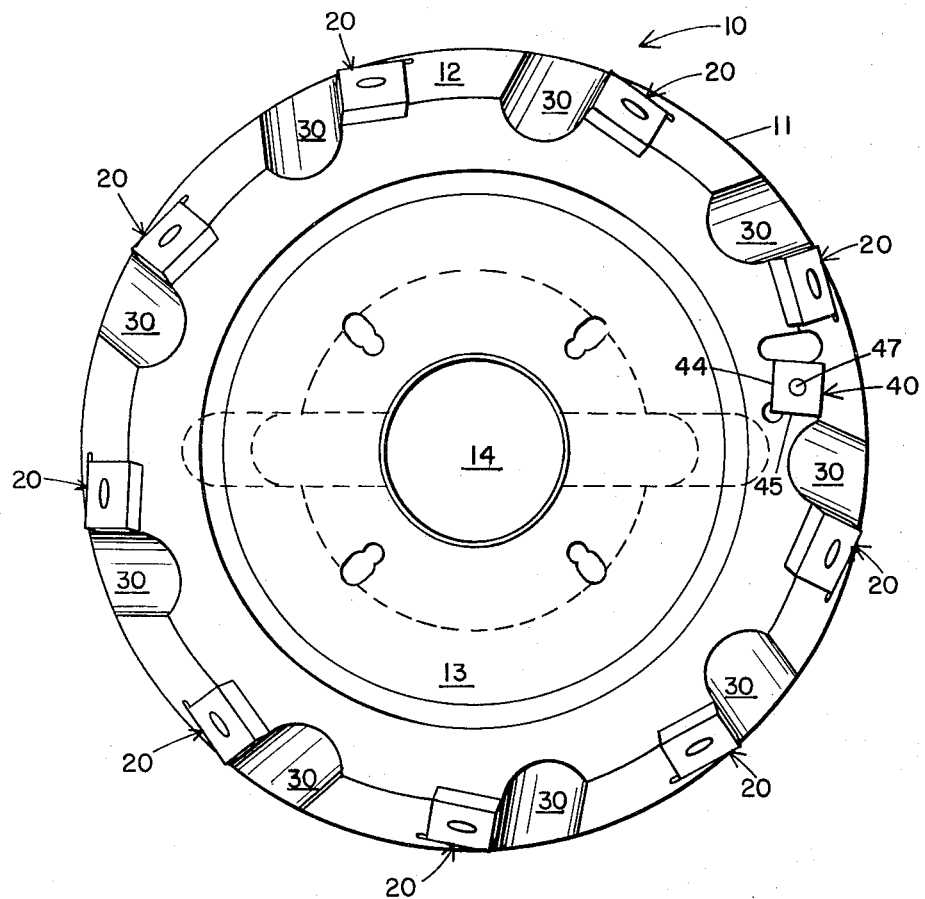
FIG. 1
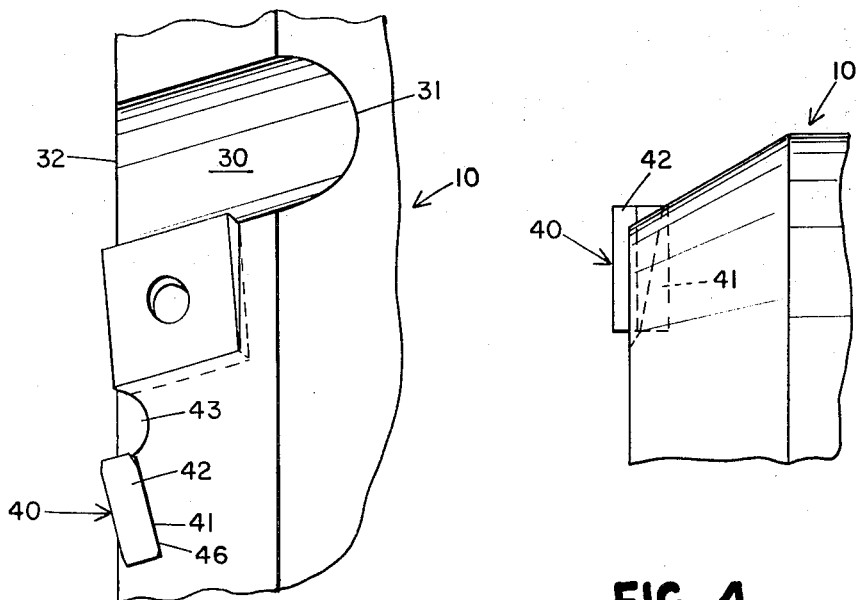
FIG. 3
FIG. 4

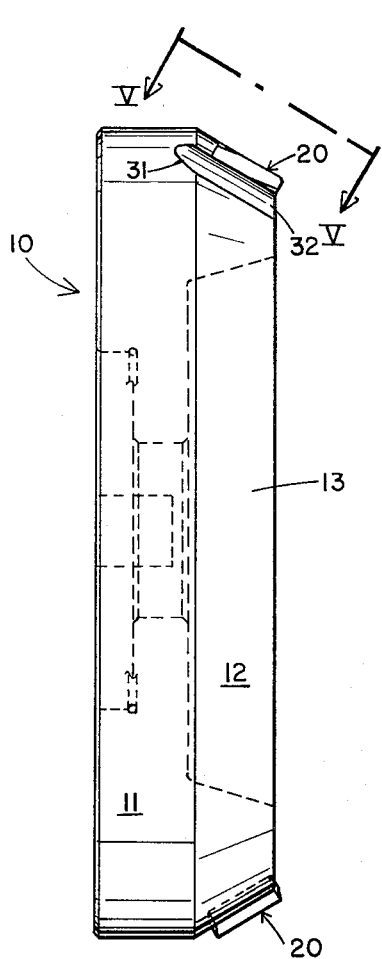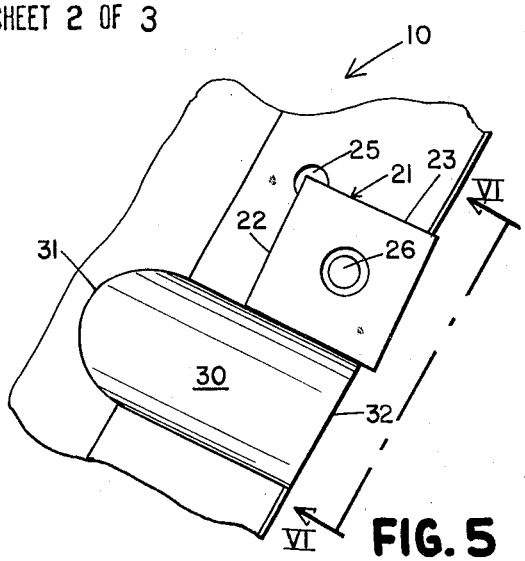
FIG. 5
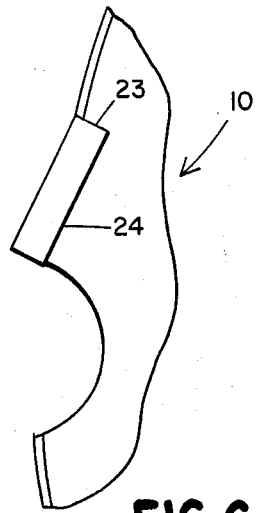
FIG. 6
FIG. 2
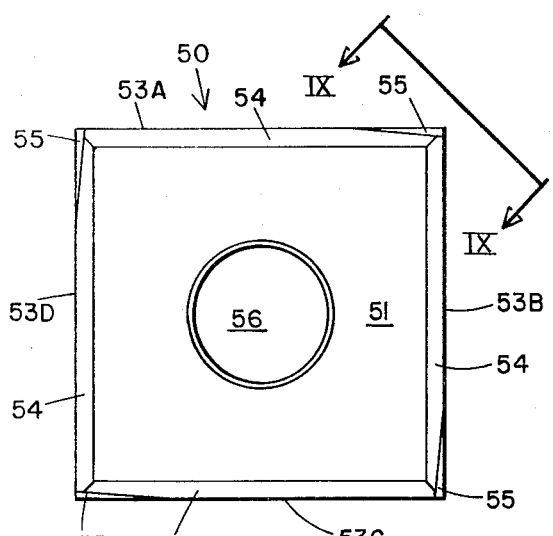
FIG. 7
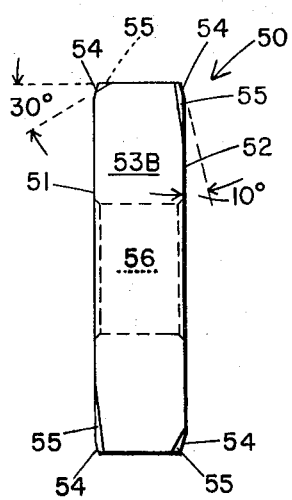
FIG. 8

CUTTER BODY AND BLADE THEREFOR

BACKGROUND OF THE INVENTION

This invention relates to metal cutting tools and, more particularly, to edge cutter bodies and indexable blades therefor.

Milling cutter bodies of the general type illustrated in U.S. Pat. No. 3,487,535 issued Jan. 6, 1970 wherein the blades protrude generally radially from the cutter body have been widely accepted. This acceptance has been enhanced by the advent of the indexable, throw-away blade. Cutters such as these do suffer the drawback, however, that the indexable cutting blades are positioned on the cutter body so as to be in shear during cutting causing limitations in the rate at which metal can be removed.

It has been proposed heretofore to position indexable, throw-away cutter blades on a milling cutter body in generally parallel relationship to a frusto-conical section of the body such that the blades will be in compression rather than shear during the cutting process (these cutters are referred to hereinafter as edge cutters). Such positioning of the blades has permitted a greater rate of metal removal. Great difficulty has been encountered, however, in positioning the blade on the cutter body in such a fashion that the same will remain firmly in position during the cutting process, cut with maximum effectiveness and, yet, offer a maximum number of cutting edges for economical blade usage. One prior art cutter body of this general edge cutter type of which applicant is aware, for example, has a blade and pocket combination such that the blade can be indexed to only four cutting edges prior to discarding it.

OBJECTS AND SUMMARY OF THE INVENTION

It is an object of this invention to provide a cutter body and indexable blade therefor which fully exploits the advantages of the peripheral or edge-mounted blade, which will perform an extremely effective cutting operation and, yet, wherein the individual cutting blades can be indexed a sufficient number of times to permit optimal use of the cutting blade.

It is an object of this invention, more particularly, to provide a cutter body and indexable blade therefor of the general type described wherein the blade pocket configuration is such that the indexable blade can be indexed to twice the number of cutting edges as it has sidewalls to insure maximum effective use of the blade.

Parallel objects of this invention, therefore, are to provide both a cutter body configuration of the general type described and an indexable blade therefor which permit utilization of the peripheral or edge-mounted blade principle with not only maximum working effectiveness but highly economical cutter and blade usage.

These and other objects of this invention are accomplished, briefly, by the provision of a cutter body having one or more peripheral or edge-mounting type cutter blade pockets, each such pocket having a severe negative radial rake and a rather slight negative axial rake which, in combination with the lead or corner angle, give an effective cutting action of negative positive geometry—i.e., negative true rake and positive angle of inclination. The indexable cutting blade includes a generally polygonal body portion having two spaced faces with interconnecting sidewalls. An effective primary clearance angle extends about the periphery of each of the faces and, preferably, a wiping and strengthening flat is provided at each of the cutting edges.

DESCRIPTION OF THE DRAWINGS

This invention will be readily understood by those skilled in the art from a reading of the following specification and accompanying drawings in which:

FIG. 1 is a front elevation of the cutter body which is the subject of this invention;

FIG. 2 is a side elevation thereof;

FIG. 3 is a fragmentary, side elevation illustrating the position of the sweep blade assembly;

FIG. 4 is a fragmentary, side elevational view of the sweep blade assembly taken from a position 90° removed from FIG. 3;

FIG. 5 is a fragmentary view of a cutting station from the plane V—V of FIG. 2;

FIG. 6 is a fragmentary view of a cutting station from the plane VI—VI of FIG. 5;

FIG. 7 is a front and rear elevation of an indexable cutter blade specifically adapted for utilization in conjunction with this invention;

FIG. 8 is a side elevation of the indexable cutter blade, each of the four sides being identical;

DESCRIPTION OF THE PREFERRED EMBODIMENT

Figure 10:
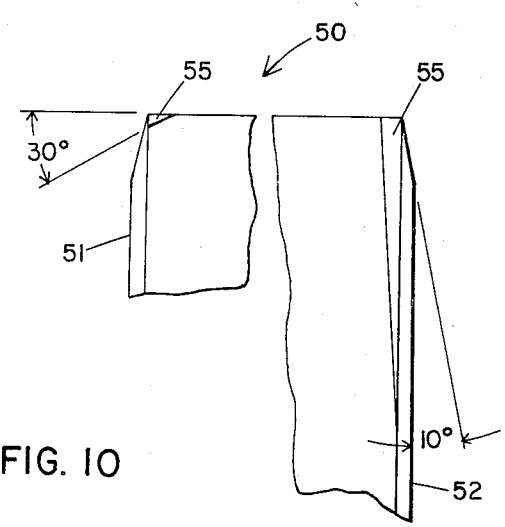
FIG. 10 is an enlarged, broken, side elevation of the cutting blade.

Referring initially to FIGS. 1 and 2, there is illustrated a cutter body 10 having a generally cylindrical rear section 11 and a frusto-conical forward section 12.

Cutter body 10 includes a centrally hollowed section 13, as is conventional. An axial bore 14 is provided for receipt of a conventional pilot, suitable keyways, apertures and recesses being provided to secure the body 10 for rotation with a machine tool spindle.

Positioned about the periphery of the body 10 on the sloped surface of frusto-conical section 12 are a series of nine cutting blade stations 20. While the number and spacing of the stations 20 does not in and of itself form a part of this invention, it should be noted that best results will be obtained on certain work pieces when the stations 20 are randomly spaced.

Referring now additionally to FIGS. 3 through 6, each of the cutting blade stations 20 includes a cutting blade pocket 21 suitably machined into the outwardly facing surface of frusto-conical section 12. The pockets 21 include a rear locating surface 22, a trailing locating surface 23 and a lead or corner angle locating surface 24. The inner section between locating surfaces 22 and 23 may include a relief or recess 25 as an aid to fabrication of the pocket. The lead locating surfaces are drilled and threaded, preferably in accordance with the teachings of U.S. Pat. No. 3,341,919, to accept screws adapted to retain the blades 50 in position within the pockets.

The positions of the locating surfaces 22–24 on the right-hand cutter illustrated are determined for a given diameter by the following procedure: (1) the blade is placed on the outer surface of the frusto-conical section 12 with the forward edge 53A thereof parallel to the front face 32 of the cutter body; (2) the heel of the blade 53D is pushed rearward radially about edge 57 a sufficient distance to permit performance of step (3) without creating a dragging condition (the negative radial rake given the cutting edge by this step will be much greater or severe than that which has been previously considered normal); (3) the blade is rotated clockwise as viewed directly on (FIG. 5) about the corner formed by sidewalls 53A and 53B to create a positive angle of inclination for the cutting edge. The performance of step (2), as will be readily appreciated by those having an understanding of this art, causes the rear corner of the blade formed by sidewalls 53A and 53D to clear the face of the cutter, thus permitting the tilting or rotation of the blade in a more positive axial direction as recited in step (3) to create a positive angle of inclination. Once a positive angle of inclination of the desired degree has been obtained, the angular positions of the locating surfaces 22–24 can be finally determined and the pockets 20 cut into cutter body 10.

It has been found, for example, that on a cutter body having a diameter of approximately 11 inches, a radial rake of a minus 17½° and an axial rake of a minus 4° in conjunction with the 30° lead or corner angle will provide positive angle of inclination with excellent results. These dimensions and the procedures outlined heretofore and hereinafter, in addition, will permit the utilization of a cutter blade capable of being indexed to twice the number of cutting edges as it has sidewalls to be described hereinafter.

A chip pocket 30 is positioned adjacent the leading edge of each of the blade stations 20. Chip pockets 30, which may be generally U-shaped in cross-section, slope radially inwardly from a point 31 on cylindrical section 11 and forwardly through the frusto-conical section 12, opening in a generally U-shaped configuration at the face thereof. These pockets, as will be readily appreciated by those skilled in the art, function during utilization of this apparatus to allow the chips to flow in such a direction that they will not interfere with the machining process.

Cutter body 10 is provided preferably with a sweep blade assembly 40, the same functioning to finish the work piece. This assembly, which has been utilized heretofore in the art, includes a blade pocket 41 having a blade 42 suitably affixed therein. A chip pocket 43 is provided forwardly of the cutting section of a blade, suitable locating surfaces 44–46 being provided in the face of frusto-conical section 12 to receive and position the indexable sweep blade 42. Blade 42, preferably, is retained in position within its pocket in accordance with the teachings of the aforementioned U.S. Pat. No. 3,341,919. The sweep blade face projection exceeds that of cutting blades 50 by 0.003 to 0.004 and is positioned radially lightly within the cutting diameter of the blades 50.

Figure 9:
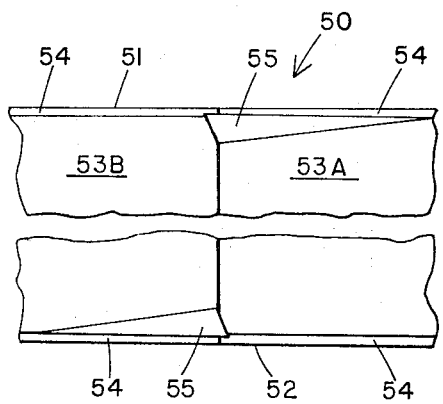
FIG. 9 is an enlarged view of a corner of the cutting blade taken from plane IX—IX of FIG. 7, all corners thereof being identical.

The cutting blade configurations illustrated in FIGS. 1 through 6 are demonstrative only, the actual blade 50 being illustrated in detail in FIGS. 7 through 10. This blade is configured such that all sides and both faces appear identical when viewed in elevation.

Referring now specifically to FIGS. 7 through 10, the rather severe negative radial rake of the blade pockets 21 create an excessive blade clearance which is compensated for by the grinding of a primary clearance angle or chamfer 54 completely about the periphery of each of the opposed faces 51 and 52 of the blades 50. Angles 54 are ground such that the surfaces thereof form an angle of approximately 10 degrees with respect to the opposed faces 51 and 52 of the blades. These angles function not only to bring the clearance of the cutting edge of the blade within acceptable limits but, additionally, add strength to the cutting edge and aid in the dissipation of heat.

It has been found desirable, additionally, to provide a wiping and strengthening flat 55 at each of the eight corners of the blade 50. This flat, as illustrated in FIGS. 7 through 10, is relatively wide at each of the corners and narrows in triangular fashion in a direction toward the center of each side 53 of the blade. The wiping and strengthening flat should be ground with respect to sidewalls 53 at an angle approximately equal to the lead or corner angle, with a length and width that will not interfere unduly with the other cutting edges. In the preferred embodiment, the wiper flat is ground at an angle of 30° with respect to the sidewalls 53 and extends inwardly no more than one-fourth the face dimension of the blade. The primary function of the flat 55 is to increase the strength of the blade, the same giving an effective cutting edge of approximately 120° as opposed to 100°. The flat functions, additionally, to aid in the dissipation of heat at the cutting edge and provide, in conjunction with sweep blade assembly 40, a smoothly finished part.

It will be noted, from an examination of FIGS. 7 through 10, that the blade 50 has eight separate identical cutting surfaces or edges symmetrically spaced about the center bore 56 thereof. This blade, therefore, is capable of being indexed on the cutter body 10 a total of eight separate times, each such indexing step bringing a completely new, undamaged cutting edge or surface into operative position. The first four cutting surfaces may be brought into working position by merely rotating blade 50. Once these surfaces have been exhausted, the blade is inverted and the remaining four surfaces on the opposite side of the blade utilized. A fully used blade may be reconditioned for reuse by regrinding the primary clearances and flat.

The specific angles and dimensions for the cutter body and blade which are given in this specification and the accompanying drawings have proved fully satisfactory for a cutter body having a diameter of approximately 11 inches and a ¾ inch square carbide blade having a thickness of ¼ inch. As cutter body diameter is reduced, it will be necessary, of course, to increase the negative radial rake angle of the blade pockets. Minor adjustments may be necessary, additionally, in the blade configuration. All of these adjustments can be readily accomplished by those skilled in the art from a study of the principles set forth in this specification and the accompanying drawings.

The advantages of the cutter body and blade therefor which are the subjects of this invention will be readily apparent to those skilled in the art. An edge cutter has been provided which, due to the blade pocket geometry, renders possible the utilization of a blade indexable to twice the number of cutting positions as it has sidewalls. The combination, additionally, has the most desirable effective cutting geometry and will handle large cutting loads with a maximum degree of effectiveness.

While a preferred embodiment of this invention has been described in detail, it will be apparent to those skilled in the art that other embodiments may be conceived and fabricated without departing from the scope of this invention. Such other embodiments are to be deemed included within the scope of the following claims unless these claims, by their language, expressly state otherwise.

The embodiments of the invention in which an exclusive property or privilege is claimed are defined as follows:

1. An edge cutter body adapted to receive and retain one or more cutting blades, each such blade having two spaced faces and at least four interconnecting sidewalls, said body comprising:

mounting means for attaching the body to a machine tool;

a generally frusto-conical section surrounding and affixed to said mounting means, said section having one or more cutting stations located on the sloped, radially outwardly facing periphery thereof;

a blade pocket positioned at each of said cutting stations, each said pocket having rear, trailing and lead locating surfaces, said lead locating surface and the faces of a blade positioned in said pocket being generally parallel to the outwardly facing periphery of said frustoconical section, said rear and trailing locating surfaces being at an angle with respect to one another of at least 90°, said surfaces providing a lead angle, a relatively extreme negative radial rake angle and a relatively slight negative axial rake angle for the cutting edge of a blade positioned in said pocket, whereby a regular polygonal blade having at least four identical sidewalls and having twice the number of indexable cutting edges that it has sidewalls generally symmetrically spaced about the center thereof can be utilized in said pocket, said rake angles, in conjunction with said lead angle providing an effective negative tube rake and positive angle of inclination for the cutting edge of said blade; and means for retaining a blade in said pocket with one of the faces thereof resting upon said lead locating surface and with two adjacent sidewalls thereof in abutment with said rear and trailing locating surfaces.

2. The cutter body as set forth in claim 1 which further comprises a cylindrical section containing said mounting means, said frusto-conical section being affixed to and extending forwardly from said cylindrical section.

3. In combination with the cutter body recited in claim 1, an indexable cutting blade having eight cutting edges generally symmetrically spaced about its center comprising a substantially square body portion having two spaced faces and four identical interconnecting sidewalls defining eight corners; a primary clearance angle extending about the periphery of each of said faces; and means for affixing said blade within one of said pockets with adjacent sidewalls thereof abutting said rear and trailing locating surfaces and one of said faces abutting said lead locating surfaces.

4. The blade as set forth in claim 3 which further comprises a wiping and strengthening flat at each of said corners, said flat narrowing in width progressively from the corner at which it is positioned toward the center of the sidewall along which it extends.

5. The blade as set forth in claim 4 wherein said wiping and strengthening flat is triangular and is formed along the intersection of the sidewall and primary clearance angle.

6. The blade as set forth in claim 3 wherein said clearance angle is approximately 10° with respect to said faces.

7. The blade as set forth in claim 5 wherein said wiping and strengthening flat is at an angle approximately equal to the lead angle with respect to the sidewall which it intersects.

8. The blade as set forth in claim 3 wherein said affixing means comprises an aperture centrally located in said blade.

9. In combination with the cutter body described in claim 1, an indexable cutter blade comprising:

a substantially regular polygonal body portion having two spaced faces and at least four identical interconnecting sidewalls defining a series of corners spaced about the periphery of each of said faces;

a wiping and strengthening flat at each of said corners, said flat narrowing progressively from the corner at which it is positioned toward the center of the sidewall along which it extends; and means for affixing said blade to said cutter body.

10. The combination of claim 9 further comprising a primary clearance angle extending about the periphery of each of said faces.

11. The combination of claim 9 wherein said rear, trailing and lead locating surfaces are mutually perpendicular and wherein said cutter blade has four interconnecting sidewalls defining, in conjunction with said spaced faces, a total of eight indexable cutting edges generally symmetrically spaced about the center of the blade.

12. The combination of claim 11 wherein said lead angle is approximately 30°, said negative radial rake angle is approximately −17.5°, and wherein said negative axial rake angle is approximately −4°.

* * * * *